United States Patent [19]

Richardson

[11] Patent Number: 4,750,249
[45] Date of Patent: Jun. 14, 1988

[54] PIPE SCRAPING TOOL

[76] Inventor: Henry A. Richardson, 1021 E. Elm St., Macomb, Ill. 61455

[21] Appl. No.: 904,393

[22] Filed: Sep. 8, 1986

[51] Int. Cl.$^4$ .............................................. B23D 79/00
[52] U.S. Cl. ................... 29/81 E; 15/104.04; 29/81 F; 29/81 G; 30/381; 83/831
[58] Field of Search ................... 29/81 F, 81 G, 81 E, 29/81 R; 83/831; 30/381; 95/104.04, 104.16

[56] References Cited

U.S. PATENT DOCUMENTS

| | | | |
|---|---|---|---|
| 834,251 | 10/1906 | Bailey | 83/831 |
| 1,283,070 | 10/1918 | Callender | 15/104.04 |
| 2,583,243 | 1/1952 | Tweedie | 83/831 |
| 2,855,724 | 10/1958 | Graves | 83/831 |
| 3,214,824 | 11/1965 | Brown | 15/104.04 X |
| 4,218,820 | 8/1980 | Cleva | 30/381 X |
| 4,530,679 | 7/1985 | Reynolds | 30/381 X |

Primary Examiner—Howard N. Goldberg
Assistant Examiner—Irene Cuda
Attorney, Agent, or Firm—Clement and Ryan

[57] ABSTRACT

A pipe scraping tool for cleaning scale and other deposits from the exterior surfaces of pipes. The tool includes a plurality of inverted "U"-shaped scraper members each of which is carried by one of a series of interconnected hinged links, each link (preferably rectangular in shape) having a straight edge at each end thereof. These straight edges and the type of links used avoid excessive lateral movement of the links. The inverted "U"-shape of the scraper members provides relatively closely spaced cutting edges. The substantial length of the legs of the inverted "U"s helps avoid clogging of the tool by providing substantial exit spaces, for scale and other debris removed from the pipe exterior surfaces, between the cutting edges and the structure supporting those cutting edges, as well as between the cutting edges and the hinges that interconnect the links that carry the scraper members. Satisfactory, improved and preferred ratios of the depth and width of the spaces between adjacent cutting edges of a given scraper member of the tool are specified, as well as a similar series of ratios of the depth and width of the spaces below the hinges of the tool.

17 Claims, 2 Drawing Sheets

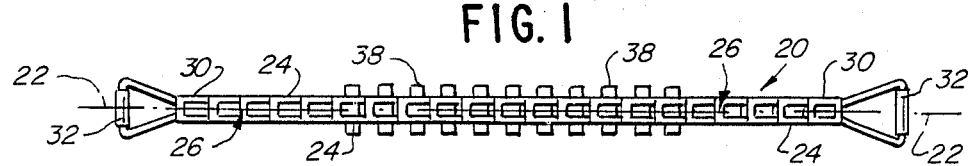
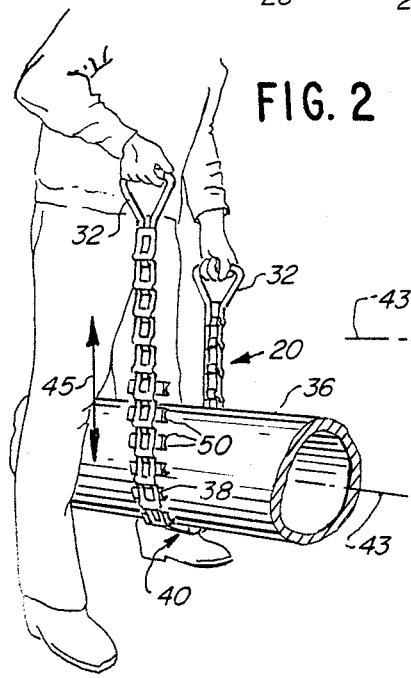
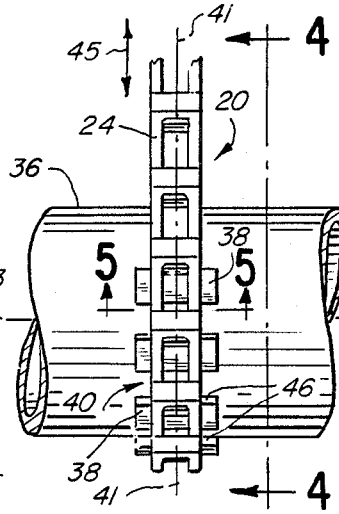
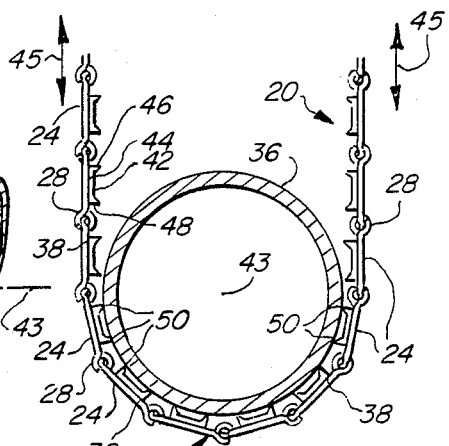
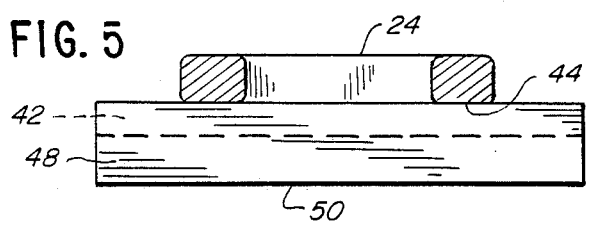
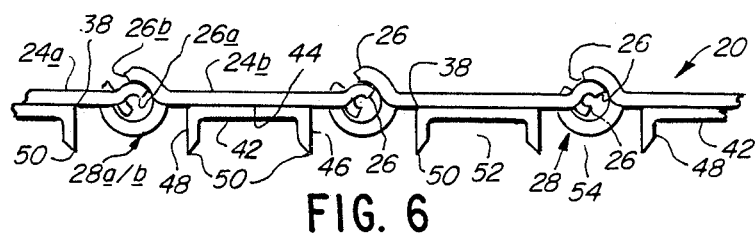
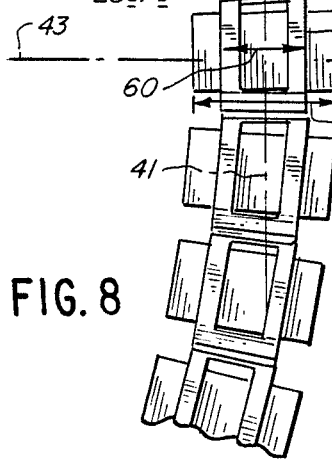
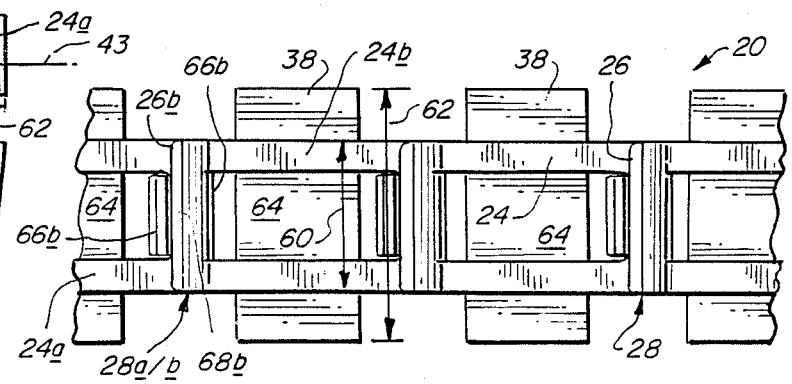

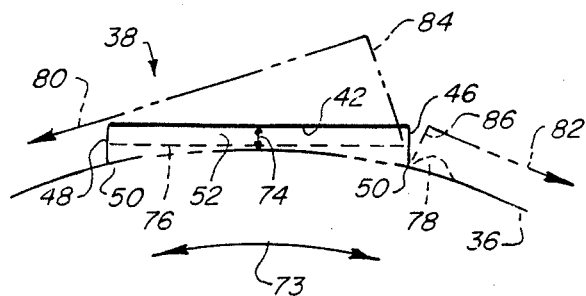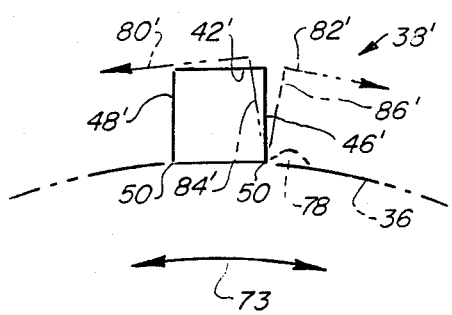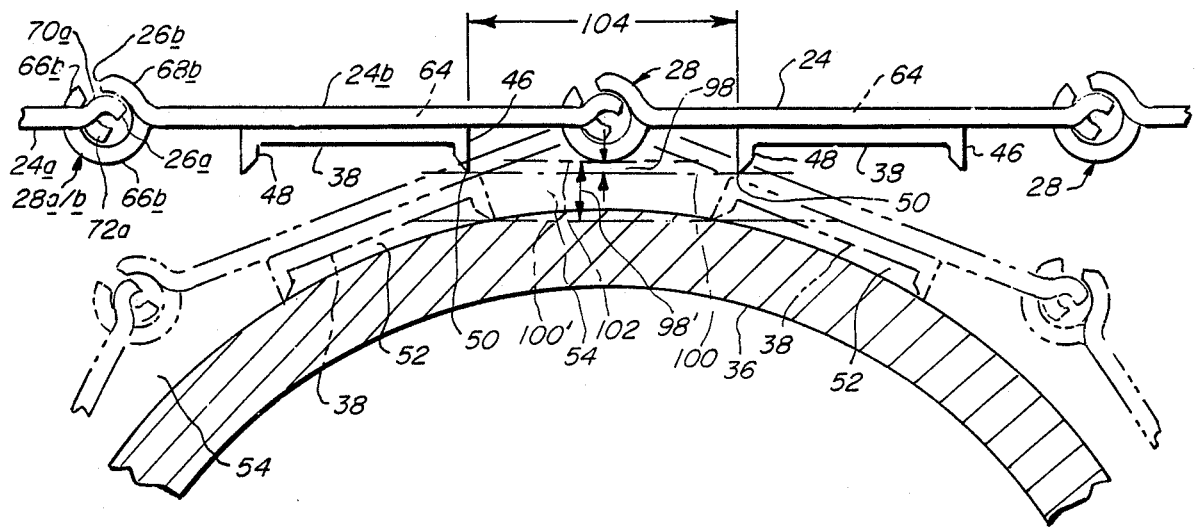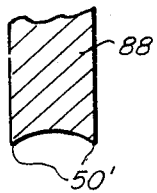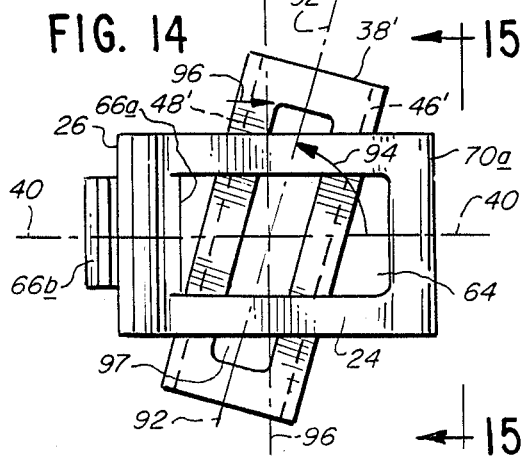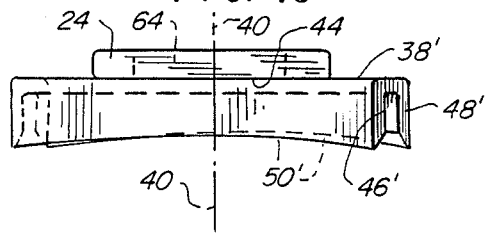

PIPE SCRAPING TOOL

This invention relates to a pipe scraping tool for cleaning scale and other deposits from the exterior surfaces of pipes. It is particularly useful for cleaning cylindrical cast iron pipes and clay sewer pipes in preexisting underground installations.

BACKGROUND OF THE INVENTION

Two prior art tools are known to applicant that comprise a flexible device for removing deposits from the exterior surfaces of pipes. These are disclosed in U.S. Pat. No. 1,283,070 issued to Callender on Oct. 29, 1918, and U.S. Pat. No. 3,214,824 issued to Brown on Nov. 2, 1965. Each of these prior art devices has shortcomings that have meant that they are not in use today, so far as applicant is aware, by those who repair underground pipe installations, usually after a break in the pipe.

The Callender device presents widely spaced cutting edges against the exterior surface of the pipe being cleaned, and thus is highly inefficient. Second, because of the rotatable mounting of its cutters or bits, the Callender device is likely to ride over (rather than remove) difficult obstructions on the exterior surface of the pipe being cleaned. Third, it is likely to become clogged with the scale and other debris that are removed from any heavily encrusted pipe.

The Brown patent was issued 47 years after the Callender patent. However, rather than solving the first two shortcomings of the Callender tool, it actually moved farther away from any such solution by exaggerating the same shortcomings. As to the third problem of clogging, because of its particular knurled scraper members it merely exchanged one type of clogging for another.

Apparently as a result of the shortcomings of the two prior art devices under discussion, so far as applicant is aware the only tool that is currently used to clean the surface of a pipe in a preexisting underground installation is a flat bar scraper. Since such pipes are usually installed at a depth of about three to five feet below the surface of the ground, it is necessary to climb down into the excavation, or hang over the pipe while attempting to scrape the bottom of the pipe. In addition to being very difficult, this process is very slow.

Use of the pipe scraping tool of the present invention avoids the shortcomings just discussed. This makes possible cost savings of as much as 50 percent for municipalities and utility companies who are required to repair broken pipes in underground install- ations.

SUMMARY OF THE INVENTION

The pipe scraping tool of this invention comprises a plurality of inverted "U"-shaped scraper members each of which is carried by one of a series of interconnected hinged links, each link (preferably rectangular in shape) having a straight edge at each end thereof.

Efficient and effective operation of the pipe scraping tool of this invention is assured because (1) the straight edges and hinges at each end of the interconnected links that carry the scraper members avoid excessive lateral movement of the links, (2) the inverted "U"-shape of the scraper members provides relatively closely spaced cutting edges, and (3) the substantial length of the legs of the inverted "U"s helps avoid clogging of the tool by providing substantial exit spaces, for scale and other debris removed from the pipe exterior surfaces, between the cutting edges and the structure supporting those cutting edges, as well as between the cutting edges and the hinges that interconnect the links that carry the scraper members.

The substantial length of the legs of each scraper member produces spaces of substantial depth between the two cutting edges on any given link, as well as between cutting edges on adjacent links. At the same time, care is taken that the spaces are not so deep that the cutting edges are caused to ride over the scale or other deposits on the exterior surface of the pipe being cleaned rather than scraping such deposits off the pipe surface. Satisfactory, improved and preferred ratios of the depth and width of the spaces between adjacent cutting edges of a given scraper member of the tool are specified, as well as a similar series of ratios of the depth and width of the spaces below the hinges of the tool.

BRIEF DESCRIPTION OF THE DRAWING

The invention will be described in connection with the accompanying drawing, in which:

FIG. 1 is a plan view of one embodiment of the pipe scraping tool of this invention, the tool being shown with its longitudinal axis extended in a straight line;

FIG. 2 is a perspective view of the pipe scraping tool of FIG. 1 being used to clean the scale and other deposits the exterior surface of a cylindrical pipe;

FIG. 3 is an enlarged, fragmentary side elevation of the pipe scraping tool of FIG. 2 as it is used to clean the exterior surface of a pipe;

FIG. 4 is a sectional view taken along the line 4—4 in FIG. 3;

FIG. 5 is a further enlarged sectional view of the pipe scraping tool shown in FIG. 3, taken along line 5—5 in the latter Figure;

FIG. 6 is an enlarged, fragmentary side elevation of the pipe scraping tool of FIG. 1;

FIG. 7 is a plan view of the portion of the pipe scraping tool shown in FIG. 6;

FIG. 8 is an enlarged, fragmentary plan view of the pipe scraping tool of FIG. 1, showing the maximum lateral displacement that successive links exhibit in this embodiment;

FIG. 9 is a diagrammatic showing of an inverted "U"-shaped scraper member of the pipe scraping tool of this invention, in operative position with respect to the surface of a pipe being cleaned;

FIG. 10 is a diagrammatic showing of another embodiment of a "U"-shaped scraper member that falls outside the definition of the scraping tool of this invention, shown in relation to the exterior surface of a pipe to be cleaned;

FIG. 11 is an enlarged, fragmentary side elevation of the pipe scraping tool of FIG. 1, showing the tool in solid lines in its extended condition with the longitudinal axis of the tool in a straight line, and in phantom lines with its longitudinal axis in a substantially semicircular arc adjacent the exterior surface of a pipe being cleaned;

FIG. 12 is an enlarged fragmentary sectional view of the bottom portion of the leg of an inverted "U"-shaped scraper member of one embodiment of the scraping tool of this invention;

FIG. 13 is an enlarged fragmentary sectional view of the bottom portion of the leg of an inverted "U"-shaped scraper member of another embodiment of the scraping tool of this invention;

FIG. 14 is a plan view of another embodiment of a link and scraper member in a pipe scraping tool according to this invention;

FIG. 15 an end elevation of the link and scraper member of FIG. 14, taken along line 15—15 in the latter Figure.

DETAILED DESCRIPTION OF SEVERAL EMBODIMENTS OF THIS INVENTION

General Construction Of Tool

In FIG. 1, pipe scraping tool 20 is arranged so that its longitudinal axis 22 extends in a straight line from one end of the tool to the other. The tool is comprised of a series of interconnected links 24 (which are rectangular in shape in the embodiment shown), each of which links has a straight edge 26 at each end thereof. The straight edges at opposite ends of a given link 24 are substantially parallel to each other. As best seen in FIG. 4, and other later Figures of the drawing, a hinge 28 connects the ends 26 of each pair of immediately adjacent links 24.

The last link 30 at each end of the series of interconnected links 24 is connected to a suitable handle 32. As shown in FIG. 2, handles 32 are grasped by the operator of the scraping tool during use of the tool to clean scale and other deposits from the exterior surface of a pipe 36.

Each of a succession of links in the middle of the series of interconnected links 24 that comprise the scraping tool of this invention carries an inverted "U"-shaped scraper member 38 to be described in more detail below.

In the operative position shown in FIG. 2, a portion of longitudinal axis 22 describes a substantially semicircular arc 40 as the scraper tool is moved back and forth around and against pipe 36. In use, scraper members 38 are held against the exterior surface of pipe 36 to clean scale and other deposits from that surface. As seen in FIG. 3, substantially semicircular arc 40 is included in plane 41, which is perpendicular to longitudinal axis 43 of cylindrical pipe 43 when scraping tool 20 is in use to clean the exterior surface of the pipe.

In FIG. 3, a portion of scraping tool 20 is shown in side elevation as the tool is moved backward and forward, around the pipe to be cleaned, in the manner illustrated in FIG. 2, as the user's hands go alternately up and down in the direction of arrows 45.

Scraper Members

FIG. 4 shows a plurality of scraper members 38, each of which has an inverted "U"-shaped cross section and is rigidly attached to one of a succession of links 24 in the middle portion of the series of interconnected links that comprises this scraping tool.

Bight portion 42 of each scraper member is connected to the bottom surface 44 of its associated link 24, and extends transversely across that link in a direction perpendicular to the paper in FIG. 4. One leg 46 of the "U" is located adjacent one end 36 of link 24 and the other leg 48 is located adjacent the opposite end 26.

As best seen in FIGS. 5 and 6, the two legs 46 and 48 extend a substantial distance away from bight portion 42 of scraper member 38. Legs 46 and 48 of inverted "U"-shaped scraper member 38 also extend a substantial distance away from hinges 28 at each end 26 of link 24.

The free end portion of each leg 46 and 48 has at least one linear cutting edge 50. It is preferred (as is shown in FIG. 5 for leg 48) that each cutting edge 50 extend parallel to bottom surface 44 of its associated link 24. As a result, when the scraping tool is in use in the manner illustrated in FIGS. 2 and 3, each cutting edge 50 will extend generally at a right angle to plane 41, which includes substantially semicircular arc 40. This arrangement of parts means that each cutting edge 50 extends substantially parallel to longitudinal axis 43 of pipe 36, which helps maintain complete contact between each cutting edge and the pipe being scraped, no matter what the diameter of the pipe may be.

Operation Of The Tool

As a result of the construction described, when scraping tool 20 is used to clean the exterior surface of a pipe, three results will follow:

1. As the tool is moved back and forth, cutting edges 50 of scraper members 38 (as best seen in FIGS. 2-4) scrape off scale and other deposits from the exterior surface of the pipe being cleaned.

2. A substantial space 52 (FIGS. 6 and 11) is present at all times between the exterior surface of the pipe being cleaned and bight portion 42 of each of the "U"-shaped scraper members 38, for the ready exit of pieces of scale and other debris that are scraped from the pipe surface.

3. A substantial space 54 (also indicated in FIGS. 6 and 11) is likewise present at all times between the pipe surface and the hinges at either end of each of the links, for the ready exit of scale and other debris removed from the pipe surface.

Hinges

As pointed out above, each interconnected link 24 has a straight edge 26 at each end of the link. The preferred shape for each link 24 is rectangular, as in the embodiment of FIGS. 1-8.

Each hinge 28a/b joining straight end edges 26a and 26b of links 24a and 24b, respectively (as in FIGS. 6, 8 and 11), is of loose enough construction that it will permit scraping tool 20 to conform readily to the curved exterior surface of any pipe that is to be cleaned. At the same time, hinge 28 is formed of tight enough construction to keep straight edges 26 at the ends of immediately adjacent links 24 generally parallel to each other and thereby avoid undue play in the lateral direction between immediately adjacent links. This restricts link 24b, for example, to a position in which its transverse axis is generally perpendicular to plane 41 that includes the substantially semicircular arc 40 of longitudinal axis 22 of the scraping tool. (See FIG. 8.)

This restriction produced by a suitable hinge construction between the respective straight edges 26 of any pair of immediately adjacent links 24 is reinforced, of course, by the pulling force that is exerted on each handle 32 by the user of the tool. It is further reinforced in the preferred embodiment of this scraping tool by the requirement that the width 60 of each link 24 is at least about one-half, and preferably more, of the length 62 of each cutting edge 50 that is carried by the link.

This latter requirement is balanced against the further preferred limitation that each cutting edge 50 should extend outward, on both sides of the link 24 with which it is associated, a substantial distance beyond the link, in order to enhance the effective cutting zone of the scraping tool.

The importance of maintaining successive links 24 with their straight end edges 26 generally parallel and the links disposed along an arc 40 that is included in plane 41, with their transverse axes generally perpendicular to that plane, arises from the desirability of avoiding having cutting edges 50 pushed laterally in one direction or another by encrusted deposits on the exterior surface of the pipe being cleaned that may turn out to be especially difficult to scrape off that surface.

In the embodiment shown in FIGS. 1–8 and 11, one portion of each hinge 28 is formed in the following manner integrally with the respective links 24 with which the hinge is associated. As best seen in FIGS. 7 and 11, in this preferred embodiment each link 24 is open in its central portion 64, and a large portion of the material that formerly occupied space 64 is wrapped around to form the major part 66b of the journal portion of hinge 28a/b located at the left-hand side of each of these Figures. The minor remaining part of the journal portion of hinge 28a/b is formed by end portion 68b that is adjacent end 26b of link 24b.

The hinge pintle for hinge 28a/b is formed by two arcuate segments at end 26a of link 24a. The portion of link 24a adjacent end 26a is curved to form major pintle segment 70a. A small portion of the material that formerly occupied space 64 in link 24a is formed into a downwardly extending arcuate segment 72a which is circumferentially continuous with arcuate segment 70a.

This preferred form of construction of hinge 28 has several advantages:

1. It produces a substantial savings in raw materials.
2. It is simple to fabricate.
3. It provides the desired flexibility in the direction perpendicular to the paper in FIG. 7, while achieving tight enough construction to keep straight edges 26 generally parallel to each other, and thereby avoid undue play in the lateral direction in the plane of the paper in FIG. 7.

Scraper Member Dimensions

As explained above, space 52 between the exterior surface of the pipe being cleaned and bight portion 42 of each of the "U"-shaped scraper members 38 performs the essential function of providing for ready exit of pieces of scale and other debris that are scraped from the pipe surface. This is illustrated diagrammatically in FIG. 9, in which scraper member 38 is shown in position to move back and forth across the exterior surface of pipe 36 in the directions indicated by arrows 73.

The bottom of space 52 is defined by the exterior surface of pipe 36 that is being cleaned by the scraper tool of this invention. The top is defined by bight portion 42 of member 38, and the sides by downwardly extending legs 46 and 48 of the "U"-shaped scraper member. Height 74 of space 52 at the center of that space is determined in a given case by the degree of curvature of the exterior surface of pipe 36, which of course varies as the size of the pipe varies.

The fixed dimensions of spacer member 38 basically determine the volume of space 52, and thus also determine the ease with which pieces of scale and other debris can find their way from that space to fall down out of the way. Satisfactory results are obtained if the ratio of (a) the distance a given one of cutting edges 50 is spaced from bight portion 42 of scraper member 38 to (b) the distance between that cutting edge and the other cutting edge 50 of the "U"-shaped scraper member 38 is at least about 1:12 but not more than about 1:2. Improved results are obtained if this ratio is between about 1:8 and about 1:3. Best results are obtained if this ratio is between about 1:5 and about 1:4.

If the ratio described is not kept at least as large as about 1:12, the volume of space 52 becomes too small to permit ready escape of pieces of scale and other debris. Such a situation is suggested by dashed line 76 in FIG. 9, which represents a position of bight portion 42 that would reduce the volume of space 52 substantially below a satisfactory level because the described ratio has been reduced to about 1:15.

On the other hand, keeping the designated ratio less than the indicated values of about 1:2, 1:3 and 1:4, respectively, provides an advantage in holding the cutting edges 50 of scraper member 38 securely against the exterior surface of pipe 36 as the various scraper members 38 that make up the scraping tool move back and forth across that surface in the directions indicated in FIG. 9 by arrows 73.

When cutting edges 50 strike encrusted deposits on the exterior surface of the pipe that turn out to be especially difficult to scrape off that surface, the scraper member 38 that carries those cutting edges will tend to tilt over and slide up across such deposits. Thus, if cutting edge 50 on the right-hand side of FIG. 9 strikes deposit 78 as scraper member 38 moves to the right on that Figure, the scraper member will tend to tilt up in the clockwise direction and permit leg 46 to slide over the deposit instead of scraping it off pipe 36. Pulling force 80 exerted by one end of interconnected links 24 opposes this tilting, while pulling force 82 exerted by the other end of the links tends to produce the tilting.

Because the distance between cutting edges 50 of the spacer member is considerably greater than the height of legs 46 and 48, moment arm 84 is considerably greater than moment arm 86, and this tends to keep scraper leg 46 and right-hand cutting edge 50 from tilting up and sliding over deposit 78, and instead forces the cutting edge to dig into that deposit and scrape it off the pipe.

FIG. 10 illustrates how the described effect of pulling force 80' as compared to pulling force 82' is reduced when the height of scraper legs 46' and 48' is too large in comparison to the width of bight 42', which reduces the mechanical advantage provided by the length of moment arm 84' compared to moment arm 86'. Hence, as already pointed out, the indicated ratio should be kept below about 1:2, 1:3, and 1:4 for satisfactory, improved and best results, respectively.

Spacing Of Cutting Edges On Scraper Members

For the most effective scraping action, the cutting edges 50 of scraper members 38 should preferably be spaced at approximately equal distances along longitudinal axis 22 of scraping tool 20, when the tool is in place around a pipe that is being cleaned. To space cutting edges 50 an equal distance along axis 22 when the scraping tool is fully extended in a straight line would not, however, accomplish the best results when the tool is actually in use.

The spacing between the two cutting edges 50 on any given scraper member 38 is fixed, in the manufacture of the scraping tool, at some suitable figure that will locate the cutting edges close enough for efficient scraping action but not so close as to tend to produce clogging between those cutting edges. This spacing, of course, remains constant at all times. On the other hand, the spacing between the immediately adjacent cutting edges 50 on a pair of scraper members that are hinged together is not fixed, and will vary from one situation to another depending upon how the tool is used.

Specifically, as illustrated in FIG. 11, the spacing between the immediately adjacent cutting edges 50 on the pair of interconnected links 24 shown on the left- and right-hand sides of FIG. 11 tends to decrease as the radius of curvature of the pipe 36 that is being cleaned tends to decrease. The volume of space 54 below hinge 28—which like space 52 below each scraper member 38 is important as providing a ready exit for pieces of scale and other debris that are scraped off the pipe being cleaned—also varies depending upon the radius of curvature of pipe 36, but it tends to increase as the pipe radius of curvature decreases.

(The volume of space 52 below scraper member 38 is likewise affected somewhat, although not to as great an extent, by the radius of curvature of pipe 36. The more significant parameter in this instance is the height of legs 46 and 48.)

Satisfactory results are obtained when the ratio of (a) the distance 98 that the plane 100 of the cutting edges 50 associated with the two links shown in FIG. 11 immediately adjacent hinge 28 in the center of the Figure is spaced from plane 102 tangent to the bottom surface of that hinge when interconnected links 24 are extended in a straight line, to (b) the distance 104 between the two cutting edges 50 located immediately adjacent each other on opposite sides of the hinge is at least about 1:24. Improved results are obtained when the ratio described is at least about 1:16, and best results are obtained when the ratio described is at least about 1:8.

The upper limit on the ratio in question is not critical, but it should be noted that the larger this ratio, the higher the hinge will protrude above the links that are connected by it, and thus if this ratio is too large the hinge will protrude so far as to make the tool cumbersome to use.

As is indicated in FIG. 11, distance 98 from plane 102 of hinge 28 to plane 100 of cutting edges 50 when series of interconnected links 24 are extended in a straight line is substantially increased condition, plane 100 drops to position 100', placing it at a distance 98' below plane 102 tangent to the bottom surface of hinge 28.

Other Embodiments

The cutting edge or edges on the bottom of the legs of "U"-shaped scraper members 38 may have any suitable form. In FIG. 12, the free end of downwardly extending leg 88 of a scraper member is concave in cross-section, which produces two cutting edges 50'. In FIG. 13, downwardly extending leg 90 of a spacer member terminates in a wedge-shaped cutting edge 50", rather than the chisel-shaped cutting edge 50 that is shown in FIGS. 6 and 11.

FIGS. 14 and 15 illustrate an alternative embodiment of the scraper member of the tool of this invention. In this embodiment, scraper member 38' (represented by longitudinal axis 92 in FIG. 14) extends at acute angle 94 to the plane that includes substantially semicircular arc 40 of longitudinal axis 22 of the series of interconnected links 24 that comprise the scraping tool of this invention. As a result, each cutting edge of legs 46' and 48' of spacer member 38' is disposed at an acute angle, such as angle 96 in FIG. 14, to the plane perpendicular to link 24 that includes longitudinal axis 43 of the pipe being cleaned.

As shown in FIG. 15, each cutting edge 50' of downwardly extending legs 46' and 48' of scraper member 38' is concavely curved, from one end to the other, with respect to the bottom surface 44 of link 24 with which the scraper member is associated. This Figure illustrates again, as does FIG. 14, that legs 46' and 48', with their respective cutting edges 50', extend at an acute angle to the plane tnat includes substantially semicircular arc 40 of longitudinal axis 22 of series of interconnected links 24.

As a result of the tilted positioning of scraper member 38' just described, when the scraping tool of this invention is moved back and forth in directions 95 along substantially semicircular arc 40 as shown in FIG. 14, pieces of scale and other debris scraped from the surface of the pipe being cleaned will tend to be pushed to one side or the other (that is, upward or downward in FIG. 14), and to fall more freely from the space between the cutting edges of scraper member 38'. The free exit of such pieces of scale and other debris is further assured by the fact that scraper member 38' (as seen in FIG. 14) is open in its central portion 97 and link 24 is open in its central portion 64, with a part of open portion 97 being aligned with open portion 64.

Because of the fixed curvature of cutting edges 50' in the form of the scraping tool of this invention that is shown in FIGS. 14 and 15, this embodiment is best used to clean pipes that have a radius approximately equal to a predetermined figure that represents the radius of curvature of cutting edges 50'.

The above detailed description is given for ease of understanding only. No unnecessary limitations should be understood therefrom, as modifications will be obvious to those skilled in the art.

I claim:

1. A pipe scraping tool for cleaning scale and other deposits from the exterior surface of a pipe, which comprises:
   (a) a series of interconnected links, each of said links having a straight edge at each end thereof, the straight edges at opposite ends of a given link being substantially parallel to each other;
   (b) a hinge connecting the end of each pair of immediately adjacent links, the last link at each end of said interconnected series of links being connected to a handle for grasping by the operator of said scraping tool, said series of links having a longitudinal axis extending from one of said handles to the other, a portion of said axis describing a substantially semicircular arc when said scraping tool is held by the user of the tool in a plane substantially perpendicular to the longitudinal axis of the pipe being cleaned, in its operative position for movement back and forth around and against said pipe; and
   (c) a plurality of scraper members, each of said scraper members having an inverted "U"-shaped cross-section and being rigidly attached to one of a succession of links in the middle of said series of links, each of said cross-sections including a bight portion and two legs of substantially equal length, the bight portion of said "U"-shaped scraper member being secured to the bottom surface of its associated link, and said two legs extending transversely across said associated link with one leg of said "U" adjacent one end of said link and the other leg of the "U" adjacent the other end of the link, the two legs of said inverted "U"-shaped scraper member extending a substantial distance away from the bight portion of said scraper member and a substantial distance away from the hinges at each end of said link, the free end portion of each of said legs having at least one cutting edge, each of said at least one cutting edge (i) being positioned transverse to the plane that includes the aforesaid substantially semicircular arc of the longitudinal axis of the series of interconnected links, and (ii) extending outward, on both sides of the link with which it is associated, a substantial distance beyond said link, whereby, when said scraping tool is used to clean the exterior surface of a pipe, (a) a substantial space is present at all times between said exterior pipe surface and the bight portion of each of said "U"-shape scraper members for the ready exit of pieces of scale and other debris that are scraped from said pipe surface, (b) a substantial space is also present at all times between said pipe surface and the hinges at either end of each of said links for the ready exit of such scale and other debris, and (c) the effective cutting zone of said scraper tool extends a substanial distance on each side of the pipe scraping tool.

2. The pipe scraping tool of claim 1 in which each of said cutting edges extends parallel to said bottom surface of its associated link and, when said scraping tool is in use, each of said cutting edges extends generally at right angles to the plane that includes said substantially semicircular arc of the longitudinal axis of the series of interconnected links, whereby each of said cutting edges extends substantially parallel to the longitudinal axis of the pipe that is being cleaned.

3. The pipe scraping tool of claim 1 in which each of said cutting edges is concavely curved, from one end thereof to the other, with respect to the bottom surface of the link with which it is associated, and extends at an acute angle to the plane that includes said substantially semicircular arc of the longitudinal axis of the series of interconnected links, whereby each of said cutting edges is disposed at an acute angle to the plane perpendicular to said link that includes the longitudinal axis of the pipe that is being cleaned.

4. The pipe scraping tool of claim 1 in which each of said links is restricted, when said scraping tool is in use, is restricted by hinges of sufficiently tight construction at each end thereof to a position in which said straight edges at the ends of immediately adjacent links are generally parallel to each other at all times.

5. The pipe scraping tool of claim 1 in which the width of each of said links is at least about ½ the length of the cutting edges carried by it, whereby each of said links is restricted, when said scraper tool is in use, to a position that is generally constant with respect to the plane including said semicircular arc of said longitudinal axis of the series of interconnected links.

6. The pipe scraping tool of claim 1 in which (a) each of said links is open in its central portion, (b) the bight portion of each of said "U"-shaped scraper members is open in its central portion, and (c) at least a part of said open portion of said scraper member is aligned with at least a part of said open portion of the link to which said scraper member is secured.

7. The pipe scraping tool of claim 1 in which one end portion of each of said links that carries a scraper member forms a hinge pintle for the hinge between said link and an immediately adjacent link, and a portion of said immediately adjacent link forms a journal in which said hinge pintle is seated.

8. The pipe scraping tool of claim 1 in which each of said links is open in its central portion.

9. The pipe scraping tool of claim 1 in which the bight portion of each of said "U"-shaped scraper members is open in its central portion.

10. The pipe scraping tool of claim 1 in which the ratio of (a) the distance a given one of said cutting edges is spaced from the bight portion of the "U"-shaped member of which it is a part to (b) the distance between said cutting edge and the other cutting edge of said "U"-shaped scraper member is between about 1:12 and about 1:2.

11. The pipe scraping tool of claim 10 in which said ratio is between about 1:8 and about 1:3.

12. The pipe scraping tool of claim 10 in which said ratio is between about 1:5 and about 1:4.

13. The pipe scraping tool of claim 1 in which, when said series of interconnected links is extended with its said longitudinal axis in a straight line, the ratio of (a) the distance each of said cutting edges associated with a pair of said links immediately adjacent a given one of said hinges is spaced from the plane of the bottom surface of said given hinge to (b) the distance between the two cutting edges located immediately adjacent each other on opposite sides of said given hinge is at least about 1:2.

14. The pipe scraping tool of claim 1 in which said ratio is at least about 1:16.

15. The pipe scraping tool of claim 1 in which said ratio is at least about 1:8.

16. A pipe scraping tool for cleaning scale and other deposits from the exterior surface of a pipe, which comprises:

(a) a series of interconnected links, each of said links having a straight edge at each end thereof, the straight edges at opposite ends of a given link being substantially parallel to each other;

(b) a hinge connecting the ends of each pair of immediately adjacent links, the last link at each end of said interconnected series of links being connected to a handle for grasping by the operator of said scraping tool, said series of links having a longitudinal axis extending from one of said handles to the other, a portion of said axis describing a substantially semicircular arc when said scraping tool is held by the user of the tool in a plane substantially perpendicular to the longitudinal axis of the pipe being cleaned, in its operative position for movement back and forth around and against said pipe, each of said hinges being of sufficiently tight construction to restrict each of said links, when said scraping tool is in use, to a position in which said straight edges at the ends of immediately adjacent links are generally parallel to each other at all times, one end portion of each of said links forming a hinge pintle for the hinge between said link and an immediately adjacent link, a portion of said immediately adjacent link forming a journal in which said hinge pintle is seated; and (c) a plurality of scraper members, each of said scraper members having an inverted "U"-shaped cross-section and being rigidly attached to one of a succession of links in the middle of said series of links, each of said cross-sections including a bight portion and two legs of substantially equal length, the bight portion of said "U"-shaped scraper member being secured to the bottom surface of its associated link, and said two legs extending transversely across its said associated link with one leg of said "U" adjacent one end of said link and the other leg of the "U" adjacent the other end of the link, the two legs of said inverted "U"-shaped scraper member extending a substantial distance away from the bight portion of said scraper member and a substantial distance away from the hinges at each end of said link, the free end portion of each of said legs having at least one cutting edge, each of said at least one cutting edge (i) being positioned transverse to the plane that includes the aforesaid substantially semicircular arc of the longitudinal axis of the series of interconnected links, (ii) extending substantially parallel to said at least one cutting edge on the other one of said two legs, and (iii) extending outward, on both sides of the link with which it is associated, a substantial distance beyond said link, whereby, when said scraping tool is used to clean the exterior surface of a pipe, (a) a substantial space is present at all times between said exterior pipe surface and the bight portion of each of said "U"-shaped scraper members for the ready exit of pieces of scale and other debris that are scraped from said pipe surface, (b) a substantial space is also present at all times between said pipe surface and the hinges at either end of each of said links for the ready exit of such scale and other debris, and (c) the effective cutting zone of said scraper tool extends a substantial distance on each side of the pipe scraping tool.

17. The pipe scraping tool of claim 16 in which (a) each of said links is open in its central portion, (b) the bight portion of each of said "U"-shaped scraper members is open in its central portion, and (c) at least a part of said open portion of said scraper member is aligned with at least a part of said open portion of the link to which said scraper member is secured.

* * * * *

UNITED STATES PATENT AND TRADEMARK OFFICE
CERTIFICATE OF CORRECTION

PATENT NO. : 4,750,249
DATED : June 14, 1988
INVENTOR(S) : Henry A. Richardson

It is certified that error appears in the above-identified patent and that said Letters Patent is hereby corrected as shown below:

Col. 2, line 27, before "the" insert -- from --.

Col. 7, line 39, after "increased" insert -- when the series of links is arranged in a semicircular arc for use in the actual cleaning process. In this --.

Col. 10, line 24, correct "1:2" to read -- 1:24 --.

Signed and Sealed this

Twenty-eighth Day of March, 1989

Attest:

DONALD J. QUIGG

*Attesting Officer*   *Commissioner of Patents and Trademarks*